United States Patent [19]

Terakawa et al.

[11] Patent Number: 5,569,690
[45] Date of Patent: Oct. 29, 1996

US005569690A

[54] RUBBER COMPOSITION FOR TIRE

[75] Inventors: Katsumi Terakawa; Kiyoshige Muraoka, both of Kobe; Minoru Ueda, Izumi; Naohiko Kikuchi, Akashi; Toshirou Matsuo, Kakogawa, all of Japan

[73] Assignee: Sumitomo Rubber Industries Limited, Hyogo, Japan

[21] Appl. No.: 425,432

[22] Filed: Apr. 20, 1995

[30] Foreign Application Priority Data

Apr. 20, 1994 [JP] Japan .................................. 6-081826
Dec. 16, 1994 [JP] Japan .................................. 6-313521
Apr. 6, 1995 [JP] Japan .................................. 7-081502

[51] Int. Cl.$^6$ ........................................................ C08L 9/00
[52] U.S. Cl. ..................... 524/251; 524/252; 524/495; 524/496
[58] Field of Search ................................ 524/495, 496, 524/251, 252

[56] References Cited

U.S. PATENT DOCUMENTS 2,058,840  10/1936  Thies ............................................ 18/53

FOREIGN PATENT DOCUMENTS 0068468  1/1983  European Pat. Off. .
1-24166  5/1989  Japan .

OTHER PUBLICATIONS

Database WPI, Week 8311, Derwent Publ. Ltd. AN 26098K & JP–A–58 019 341, Feb. 1983.
Chemical Abstracts, vol. 107, No. 10, 7 Sep. 1987, abstract No. 79226, C. S. Baker et al.

*Primary Examiner*—Edward J. Cain
*Attorney, Agent, or Firm*—Birch, Stewart, Kolasch and Birch, LLP

[57]  ABSTRACT

A rubber composition for a tire is provided which is excellent in wet grip performance on a wet road surface and in fuel saving performance. A tire tread and a tire which include such a rubber composition are also provided.

17 Claims, 2 Drawing Sheets a (———); NO EPOXY GROUP AND NO AMINO GROUP ARE CONTAINED.
b (- - -); EPOXY GROUP IS CONTAINED BUT NOT AMINO GROUP.
c (— — —); EPOXY GROUP AND AMINO GROUP ARE CONTAINED.
d (— - —); NO EPOXY GROUP BUT AMINO GROUP IS CONTAINED.

e (---); EPOXY GROUP IS CONTAINED BUT NOT AMINO GROUP.
f (—·—); EPOXY GROUP AND AMINO GROUP ARE CONTAINED.
g (——); NO EPOXY GROUP AND NO AMINO GROUP ARE CONTAINED.

RUBBER COMPOSITION FOR TIRE

BACKGROUND OF THE INVENTION

1. Field of the Invention

The present invention relates to a rubber composition for a tire, which is excellent in grip performance on a wet road (hereinafter referred to as "wet grip") while providing fuel savings. The present invention is also directed to a tire tread formed of such a rubber composition, and to a tire having such a tire tread.

2. Description of the Related Art

Recently the fuel saving performance of automobiles has been increasingly desired, and since the fuel saving performance depends significantly on tire characteristics, rubber compositions for tires which provide for excellent fuel saving performance are always under development. On the other hand, the wet grip performance of tires has been of great interest from the view point of safety driving.

Generally, a tire is required to have a reduced hysteresis loss so as to exhibit satisfactory fuel saving. However, a reduced hysteresis loss leads to a reduced rolling resistance and, therefore, the fuel saving results in reduced grip performance. On the other hand, a tire of higher wet grip performance naturally has a higher rolling resistance, which results in an increased hysteresis loss, hence a low fuel saving performance. Thus, the wet grip performance and fuel saving performance of a tire are not compatible with each other, and thus it is difficult to obtain a tire satisfactorily exhibiting both of these features. Therefore, an intensive study has been made to develop a rubber composition which provides a tire satisfactorily exhibiting both the wet grip performance and the fuel saving performance.

For example, it has been conventionally known that the wet grip performance is improved by using epoxidized natural rubber for a tire tread. In this case, the fuel saving performance is adversely affected, because the rubber cannot escape from the non-compatible relationship between the two characteristics. In addition, such a rubber shows a strong rolling adhesion and hence tends to offer poor rolling workability. To compensate for this adverse effect, use of silica instead of carbon black has been proposed (RUBBER WORLD, by C. S. L. Baker, et al., August 1987, p. 27 and ELASTOMERICS, by Roland Newell, July 1992, p. 22). This technique still involves disadvantages in workability, wear resistance and the like.

Alternatively, there has been proposed a rubber composition in which a compound having at least two primary amino groups and a sulfur vulcanizer are mixed with synthetic cis-1,4-polyisoprene rubber having an epoxy group in order to improve the tensile stress and strength of vulcanized synthetic cis-1,4-polyisoprene (Japanese Examined Patent Publication No. Hei 1(1989)-24166). With this rubber composition, however, both the wet grip performance and the fuel saving performance cannot be rendered compatible.

The present invention has been accomplished in view of the above mentioned technical background.

It is therefore an object of the present invention to provide a rubber composition which provides for a tire satisfactorily exhibiting both fuel saving and wet grip performances.

The present invention has intensively studied rubber compositions comprising a diene rubber having an epoxy group or a mixture of a diene rubber having an epoxy group and a diene rubber free of any epoxy group, a diamine compound having a primary amino group, and carbon black, and found that both the wet grip performance and the fuel saving performance are improved when $\tan\delta$ at $-10°$ C. and $\tan\delta$ at $-70°$ C. satisfy specific requirements. Thus the present invention has been accomplished based on such a finding.

SUMMARY OF THE INVENTION

According to the present invention, there is provided a rubber composition for a tire comprising a diene rubber having an epoxy group, either a monoamine compound or a diamine compound having a structural unit represented by the formula (1):

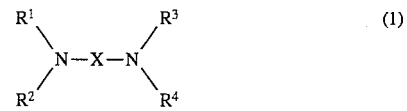

(where $R^1$, $R^2$, $R^3$ and $R^4$ are each a hydrogen atom or an alkyl group having one to three carbon atoms, and X represents any structural formula) and carbon black, wherein the rubber composition has a dissipation factor at $-10°$ C. ($\tan\delta$ ($-10°$ C.)) and a dissipation factor at $70°$ C. ($\tan\delta$ ($70°$ C.)) which satisfy the following expressions:

$0.03 \leq \tan\delta$ ($70°$ C.) $\leq 0.35$

W.I.R = {$\tan\delta$ ($-10°$ C.) $-\tan\delta$ c($-10°$ C.)}/$\tan\delta$ c($-10°$ C.)

R.I.R = {$\tan\delta$ c($70°$ C.) $-\tan\delta$ ($70°$ C.)}/$\tan\delta$ c($70°$ C.)

T.I.R = W.I.R + 2×(R.I.R) $\geq 0.3$ (where $\tan\delta$c ($-10°$ C.) and $\tan\delta$c ($70°$ C.) are $\tan\delta$ at $-10°$ C. and $70°$ C. of a control rubber composition of the same formulation as the rubber composition except that the control rubber composition includes a diene rubber having no epoxy group and is free of any amine compound).

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
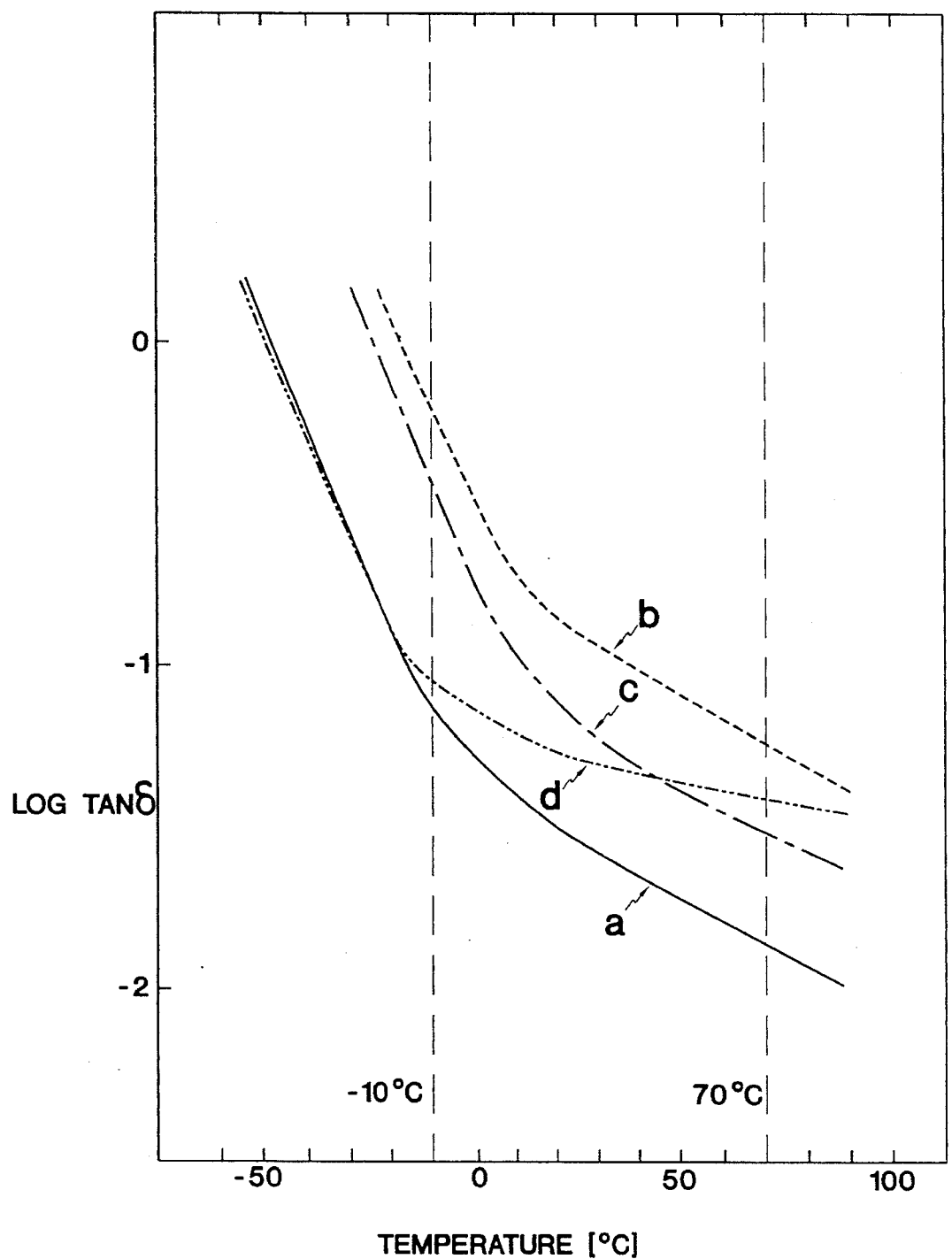
FIG. 1 is a graphic representation for showing the relationship between rubber compositions and respective $\tan\delta$ thereof.

The present invention will now be described in detail.

In the present invention, the diene rubber having an epoxy group in the molecule thereof (hereinafter referred to as "epoxidized diene rubber") is obtained by introducing an epoxy group in such a manner as to epoxidize the diene rubber such as natural rubber, polyisoprene rubber, polybutadiene rubber, solution-polymerized styrene-butadiene rubber (hereinafter referred to as "solution-polymerized SBR") or emulsion-polymerized styrene-butadiene rubber (hereinafter referred to as "emulsion-polymerized SBR") at the double bonds thereof using an organic peroxide such as peracetic acid. The diene rubber monomer is copolymerizd with a vinyl monomer having an epoxy group such as glycidyl methacrylate, or is graft-polymerized with a monomer having an epoxy group. Examples of specific diene rubbers having an epoxy group in the molecule thereof include epoxidized natural rubber, epoxidized polyisoprene rubber, epoxidized polybutadiene rubber, epoxidized styrene-butadiene rubber, an isoprene-glycidyl methacrylate copolymer, a butadiene-glycidyl methacrylate copolymer, and a styrene-butadiene-glycidyl methacrylate terpolymer. Among these, epoxidized natural rubber and epoxidized SBR are preferably used. In particular, an epoxidized solution-polymerized SBR is preferable in terms of fuel saving.

The content of the epoxy group in the epoxidized diene rubber is not particularly limited, but is preferably about 0.1 to 60 epoxy groups to 100 monomer units of the rubber, more preferably 0.5 to 40 epoxy groups, and most preferably 2 to 30 epoxy group. When such a content is less than 0.1, little improvement can be expected, whereas when it is more than 60, the resulting rubber has an excessively high glass transition temperature (Tg) which adversely affects the convenience for use, workability, and compatibility with other rubbers for blending.

The rubber component of the rubber composition according to the present invention may be a single epoxidized diene rubber, a blend of two or more kinds of epoxidized diene rubbers or a blend of an epoxidized diene rubber and a diene rubber having no epoxy groups. Where there is used the blend of an epoxidized diene rubber and a diene rubber having no epoxy groups, the proportion of the epoxidized diene rubber in the rubber component is generally 40% by weight or more, depending on the number of epoxy groups in the epoxidized diene rubber. Nevertheless, the overall content of the rubber component in the rubber composition is preferably comprised of the epoxidized diene rubber. Although the type of diene rubber having no epoxy group used for blending is not particularly limited, natural rubber and SBR are preferable.

The amine compound for use in the present invention is either the monoamine compound having one amino group in a molecule or a diamine compound having two amino groups in the molecule.

Although the monoamine compound is not particularly limited, examples thereof include primary amines such as N-hexylamine and cyclohexylamine, and secondary amines such as N-methylhexylamine and 4,4-methylene biscyclohexylamine.

The diamine compound used in the present invention is a compound having a structural unit represented by the formula (1):

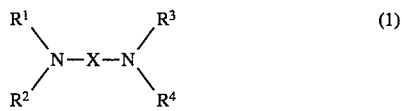

In the formula (1), $R^1$, $R^2$, $R^3$ and $R^4$ are each a hydrogen atom or an alkyl group having one to three carbon atoms. X represents any structural formula, for example, a straight or branched aliphatic alkyl group, an alicyclic hydrocarbon, an aromatic hydrocarbon including a polycyclic compound such as benzene ring or naphthalene, and a carbonyl group. Examples of diamine compounds satisfying the above requirements include aliphatic primary amines such as hexamethylenediamine; aliphatic secondary amines such as N,N'-dimethyl- 1,6-diaminohexane; tertiary amines such as N,N,N',N'-tetramethyl- 1,3-propanediamine; aromatic primary amines such as p-phenylenediamine and tolylene-2,4-diamine; aromatic secondary amines such as N,N'-dimethyl-1,4-phenylenediamine; aromatic tertiary amines such as N,N,N',N'-tetramethyl-1,4-phenylenediamine; and urea derivatives such as tetramethyl urea. Among these, the aliphatic primary amines are particularly preferable. Of the aliphatic primary amines, hexamethylenediamine is preferably used in terms of its availability.

The content of such a monoamine or diamine compound is appropriately selected depending on the type and content of epoxidized diene rubber in the rubber composition. To satisfy the tanδ requirements, the monoamine or diamine compound is used in such an amount that the proportion of amino group contained therein is preferably 0.1 mmol to 100 mmol relative to 100 parts by weight of the rubber component, more preferably 0.5 mmol to 60 mmol, and most preferably 1 to 40 mmol.

As the carbon black used in the present invention, a carbon black having a nitrogen adsorption specific surface of 50 to 250 m²/g and a DBP oil absorption of 60 to 150 ml/g is preferably used. A carbon black having a nitrogen adsorption specific surface of less than 50 m²/g or DBP oil absorption of less than 60 ml/g results in a rubber composition of poor wear resistance. On the other hand, a carbon black having a nitrogen adsorption specific surface exceeding 250 m²/g results in poor dispersion, and a carbon black having a DBP oil absorption exceeding 150 ml/g results in a rubber composition of increased viscosity and poor workability.

The content of carbon black is preferably 20 to 150 parts by weight relative to 100 parts by weight of the rubber component. A content of less than 20 parts by weight results in an insufficient reinforcing effect and poor wear resistance. On the other hand, a content of more than 150 parts by weight results in a rubber composition of poor workability and degraded physical properties.

The rubber composition of the present invention is preferably incorporated with polycarboxylic acid having two or more carboxyl groups. The addition of polycarboxylic acid allows the resulting rubber composition to have an improved rolling workability and facilitates the preparation of the rubber composition satisfying the specific requirements of tanδ at given temperatures. Examples of polycarboxylic acids are aliphatic dicarboxylic acids such as suberic acid; aromatic dicarboxylic acids such as phthalic acid; and tricarboxylic acids such as tricarballic acid. Among these, the aliphatic dicarboxylic acids such as suberic acid are preferable.

The amount of the polycarboxylic acid to be blended is appropriately selected depending on the kind and content of the epoxidized diene rubber used in the rubber composition. To satisfy the tanδ requirements, however, the polycarboxylic acid is used in such an amount as to give preferably 0.2 to 200 mmol of the carboxylic group relative to 100 parts by weight of the rubber component, more preferably 1.0 to 120 mmol, most preferably 2 to 80 mmol.

Preferably, the blending ratio of the polycarboxylic acid to the amine compound satisfies the following relationship. That is, the ratio of the mol number of contained carboxyl groups ($M_C$) to the mol number of contained amino groups ($M_A$), or $M_C/M_A$ ranges from 0.2 to 1.8 ($0.2 \leq M_C/M_A \leq 1.8$). When the ratio is less than 0.2, the rolling workability of the resulting rubber composition is not sufficiently improved. When it is not less than 1.8, the T. I. R. characteristic of the resulting rubber composition is likely to be insufficiently improved.

In the rubber composition of the present invention, various additives usually used in rubber compounding such as a vulcanizing agent, a vulcanization accelerator, a reinforcing agent, a filler, a softener, a processing aid and an antioxidant may be added as required in addition to the foregoing components.

Although the rubber composition for the tires of the present invention is of the formulation described above, the dissipation factor (tanδ) thereof is variable depending on the type and content of the epoxidized diene rubber, the type and content of the diamine compound, the type and content of other additives, the method of kneading and the method of vulcanization. The present invention is directed to rubber compositions for tires, the tanδ of which satisfies specific requirements.

General relationship between tanδ and temperature is explained by referring to FIG. 1. In FIG. 1, the solid line a indicates the tanδ of a rubber composition incorporated with a diene rubber having no epoxy group, and the dotted line b indicates a rubber composition incorporated with an epoxidized diene rubber. As can be understood from FIG. 1, when an epoxy group is introduced by epoxidizing the double bonds of the diene rubber or by the copolymerization of the diene rubber with a vinyl compound having an epoxy group, generally the peak temperature of tanδ rises, whereby tanδ at temperatures ranging from −10° C. to 70° C. is generally increased. On the other hand, the two dot chained line d indicates tanδ of a rubber composition containing a diene rubber having no epoxy group and incorporated with a primary amino compound. Comparing with the case indicated by the line a, the peak temperature of tanδ (Tα) scarcely changes, and tanδ in the low temperature region (for example, at −10° C.) scarcely changes, but tan% in the high temperature region (for example, at 70° C.) becomes greater. In FIG. 1, the one dot chained line c indicates tanδ of a rubber composition containing an epoxidized diene rubber and a primary amino compound. Although Tα of the rubber composition indicated by line c rises due to mixing of the epoxidized diene rubber, the degree of rise is smaller than that of the rubber composition indicated by the line b, and tanδ in the high temperature region is lower than that of the rubber composition indicated by the line d. It should be noted that the rubber compositions indicated by the lines a to d are of the same recipe (free of carbon black) except for the type of rubber component and the presence of the primary amino compound.

Figure 2:
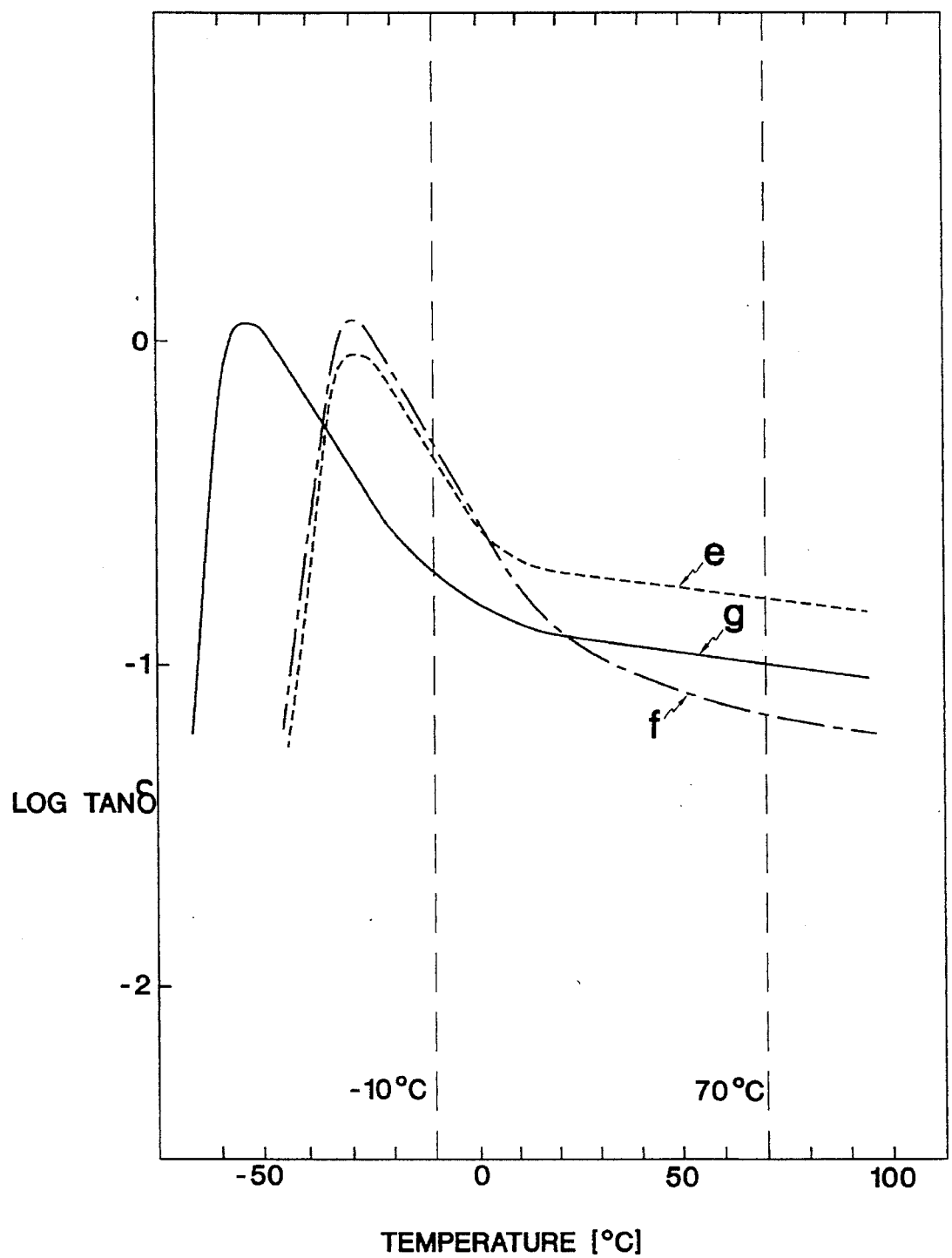
FIG. 2 is also a graphic representation for showing the relationship between rubber compositions and respective $\tan\delta$ thereof.

FIG. 2 shows the relationship between temperature and tanδ of rubber compositions containing carbon black. In the figure, solid line g indicates tanδ of a rubber composition containing a diene rubber having no epoxy group and free of any primary amino compound, dotted line e indicates tanδ of a rubber composition containing an epoxidized diene rubber and free of any primary amino compound, and one dot chained line f indicates tanδ of a rubber composition comprising an epoxidized diene rubber and a primary amino compound. The rubber compositions indicated by the lines e to g are of the same recipe except for the type of rubber component and the presence of the primary amino compound.

As can be understood from the comparison of e with g, the introduction of an epoxy group to a diene rubber raises Tα and hence generally increases tanδ over a wide temperature range. On the other hand, from the comparison of e with f, the mixing of a primary amino compound is found to decrease tanδ in the high temperature region.

These facts suggest that some reactions or interactions between amino groups and epoxy groups, and amino groups and various functional groups on the surface of carbon black such as carboxyl groups, hydroxyl groups and quinone groups improve aggregation within each molecular chain or of molecular chains. Also, the reactions or interactions presumably reduce a high order structure of carbon black formed in rubber and improve the dispersibility of the carbon black.

It is known that the wet grip performance is closely related to tanδ in the low temperature region (for example, from −10° to 0° C.), and the rolling resistance is closely related to tanδ in the high temperature region (for example, from 50° to 70° C.). A rubber with larger tanδ in the low temperature region is known to exhibit better wet grip performance, while a rubber with smaller tanδ in the high temperature region is known to exhibit more excellent fuel saving performance (refer to Y. Saito, "New Polymer Development for Low Rolling Resistance Tires", Kautschuk und Gummi Kunststoffe, 1986, p. 39).

In the present invention, the dissipation factor at −10° C. (tanδ (−10° C.)) is employed as an index of the wet grip performance and the dissipation factor at 70° C. (tan& (70° C.)) is employed as an index of the rolling resistance. The tanδ (−10° C.) and tanδ (70° C.) of the rubber composition for tire of the present invention satisfy the following expressions:

$0.03 \leq \tan\delta\ (70°\ C.) \leq 0.35$

W.I.R.={tanδ (−10° C.)−tanδc (−10° C.)}/tanδc (−10° C.)

R.I.R.={tanδc (70° C.)−tanδ (70° C.)}/tanδc (70° C.)

T.I.R.=W.I.R.+ 2×(R.I.R.)≧0.3 where tanδc (−10° C.) and tanδc (70° C.) are tanδ at −10° C. and 70° C. of a control rubber composition of a reference formulation, which is the same formulation as the rubber composition of the present invention except that the control rubber composition includes a diene rubber having no epoxy group as the rubber component thereof and is free of any amine compound and any carboxylic acid. T.I.R. is preferably 1.0 or more, especially 1.5 or more. In general, tanδ is greatly dependent on the types and contents of carbon black, softener and vulcanizing agent. Conventionally, these are optimized taking into consideration the wet grip and fuel saving performances and, in addition, other various characteristics required such as wear resistance, workability and the like. For this reason, to examine the effects of improvements by the rubber component and diamine compound, it is required to compare the rubber composition of the present invention with the control rubber composition of the reference formulation. R.I.R. is doubled in the expression of T.I.R to take merits and difficulties resulting from improvements into consideration. Further, tanδ (70° C.) is restricted within the above range because the wear resistance is extremely degraded when tanδ (70° C.) is less than 0.03, and the fuel saving performance is extremely degraded when it exceeds 0.35.

EXAMPLES

The present invention will be more fully described by way of examples. It should be noted that such examples are only illustrative of the invention and there are not limitative thereof.

Described first are methods of evaluating the characteristics of rubber compositions.
Evaluation methods
  Wet grid-Performance
  A μ-S test car provided with tires made of each rubber composition was driven on a wet road at a speed of 40 km/hr and then was braked. Friction coefficient (μ) was measured from the point where the wheels were locked to the point where the car stopped to determine the maximum friction coefficient between the points. The maximum friction coefficient of a tire made from each rubber composition was indexed with the index of the maximum friction coefficient of a tire made from rubber composition No. 2 (refer to Table 3) having a rubber component comprised of a mixture of SBR and natural rubber and free of any amine compound being assumed 100. The greater the index, the more excellent the wet grip performance.

Fuel saving

A tire was rotated at a speed of 80 km/hr under a load of 350 kgf to measure the rolling friction coefficient thereof. The maximum friction coefficient of a tire made from each rubber composition was indexed with the index of the maximum friction coefficient of a tire made from rubber composition No. 1 (refer to Table 3) having a rubber component comprised of natural rubber and free of any amine compound being assumed 100. The smaller the index, the smaller the rolling resistance, hence the more excellent the fuel saving performance.

Rolling workability

The rolling workability of each rubber composition was evaluated by kneading with two rolls of 8 inch diameter. The evaluation was based on the three ratings; ○: no problem, Δ: practically no problem though slightly adhering to rolls, and X: significantly adhering to rolls to cause problem of workability.

Diamine compound

In Examples of the present invention were used 10 types (Nos. 1–10) of diamine compounds. Compounds Nos. 9 and 10 were primary amines, compound No. 3 was a secondary amine, and the others were tertiary amines.

TABLE 1

| Diamine compound No. | Compound |
| --- | --- |
| No. 1 | N,N,N',N'-tetramethyl-1,6-hexadiamine |
| No. 2 | N,N,N',N'-tetramethyl-1,3-propanediamine |
| No. 3 | N,N'-dimethyl-1,6-diaminohexane |
| No. 4 | 1,8-bis(dimethylamino)naphthalene |
| No. 5 | Tetramethyl urea |
| No. 6 | N,N,N',N'-tetramethyl-1,4-phenylenediamine |
| No. 7 | p,p'-tetramethyl-diaminodiphenylnaphthalene |
| No. 8 | 4,4'-bis(dimethylamino)benzophenone |
| No. 9 | Hexamethylenediamine |
| No. 10 | Tolylene-2,4-diamine |

Compounding of rubber compositions containing amine compound and epoxidized natural rubber Rubber compositions Nos. 1–15

Rubber compositions Nos. 1 to 15 were compounded by mixing the compounding ingredients A listed in Table 2 with different amine compounds and rubber components shown in Table 3. Used as the epoxidized diene rubber was epoxidized natural rubber 25 having about 25 epoxy groups relative to 100 monomer units. Used as the carbon black was HAF with a nitrogen adsorption specific surface of 76 mm$^2$/g and DBP oil absorption of 100 ml/g. In Table 2 SUNNOX S is a wax, and NOCRACK 6C is an antioxidant. It is to be noted that amino group content (mmol) and formula (1) unit content (mmol) are respectively calculated from the amount of the amine compound relative to 100 parts by weight of the rubber component (hereinafter the same).

TABLE 2

| Compounding ingredients A | Amount (wt. parts) |
| --- | --- |
| Rubber component | 100 |
| Carbon black (HAF) | 50 |
| Aromatic oil | 5 |
| Chinese white | 5 |
| Stearic acid | 1 |
| SUNNOX S | 1 |
| NOCRACK 6C | 2 |
| Sulfur | 1.75 |
| Vulcanization accelerator | varied |

Using the rubber compositions Nos. 1 to 15, strip rubber specimens with a width of 4 mm and thickness of 2 mm were prepared. Using a viscoelasticity meter (VBS-F3 manufactured by Iwamoto Manufacturing K.K.), tanδ at −10° C. and 70° C. were measured under such measurement conditions as a distance between clamps of 30 mm, an initial extension of 3.3%, a dynamic amplitude of ±0.25% and a frequency of 10 Hz, and then the characteristics W.I.R., R.I.R. and T.I.R. were calculated. For the calculation of W.I.R., R.I.R. and T.I.R., the rubber composition No. 1 was employed as a control rubber composition. Formulations of rubber compositions Nos. 1 to 15, tanδ, W.I.R.., R.I.R. and T.I.R. were as listed in Table 3.

TABLE 3

| Rubber Composition | Comparative example | | | Example | | | | | | | | | | | |
| --- | --- | --- | --- | --- | --- | --- | --- | --- | --- | --- | --- | --- | --- | --- | --- |
| No. | 1 | 2 | 3 | 4 | 5 | 6 | 7 | 8 | 9 | 10 | 11 | 12 | 13 | 14 | 15 |
| Formulation | | | | | | | | | | | | | | | |
| Natural Rubber | 100 | 40 | — | — | — | — | — | — | 20 | 40 | 60 | 80 | 40 | 40 | — |
| SBR1500 | — | 60 | — | — | — | — | — | — | — | — | — | — | — | — | — |
| Epoxidized natural rubber 25 | — | — | 100 | 100 | 100 | 100 | 100 | 100 | 80 | 60 | 40 | 20 | 60 | 60 | 100 |
| N-hexylamine | — | — | — | 1.93 | — | — | — | — | — | — | — | — | — | — | — |
| Diamine compound | | | | | | | | | | | | | | | |
| ⑨ | — | — | — | — | 1.11 | 0.36 | 2.90 | 4.35 | 0.29 | 0.22 | 0.15 | 0.07 | 0.29 | 0.36 | — |
| ⑩ | — | — | — | — | — | — | — | — | — | — | — | — | — | — | 1.14 |
| Amino group content (mmol) | — | — | — | 19 | 19 | 6.2 | 50 | 75 | 5.0 | 3.8 | 2.6 | 1.2 | 5.0 | 6.2 | 19 |
| Formula (1) unit content (mmol) | — | — | — | — | 9.6 | 3.1 | 25 | 37 | 2.5 | 1.9 | 1.3 | 0.6 | 2.5 | 3.1 | 9.6 |
| Characteristics | | | | | | | | | | | | | | | |
| tan δ (−10° C.) | 0.190 | 0.231 | 0.457 | 0.546 | 0.513 | 0.537 | 0.455 | 0.490 | 0.532 | 0.454 | 0.362 | 0.303 | 0.462 | 0.476 | 0.540 |

TABLE 3-continued

| Rubber Composition | Comparative example | | | Example | | | | | | | | | | | |
|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 |
| tan δ (70° C.) | 0.097 | 0.135 | 0.158 | 0.113 | 0.070 | 0.075 | 0.083 | 0.093 | 0.082 | 0.102 | 0.101 | 0.101 | 0.088 | 0.083 | 0.185 |
| W.I.R | 0 | 0.22 | 1.41 | 1.87 | 1.70 | 1.83 | 1.39 | 1.58 | 1.80 | 1.39 | 0.91 | 0.59 | 1.43 | 1.51 | 1.84 |
| R.I.R | 0 | −0.39 | −0.63 | −0.16 | 0.28 | 0.23 | 0.14 | 0.04 | 0.15 | −0.05 | −0.04 | −0.04 | 0.09 | 0.14 | −0.91 |
| T.I.R | 0 | −0.56 | 0.15 | 1.38 | 2.54 | 2.28 | 1.82 | 1.70 | 2.11 | 1.29 | 0.83 | 0.51 | 1.62 | 1.80 | 0.03 |

As can be seen from Table 3, the rubber compositions Nos. 1 and 2 were comparative examples containing no epoxidized diene rubber, and the rubber composition No. 3 was an comparative example containing an epoxidized diene rubber but free of any primary amino compound. On the other hand, the rubber composition Nos. 4–14 were examples of the present invention which had a T.I.R. value of not less than 0.3.

Wet grip and rolling friction were evaluated on the above mentioned rubber compositions Nos. 1 to 15 by measuring methods described below. The results were as shown in Table 4.

TABLE 4

| Rubber composition No. | Wet grip | Fuel saving |
|---|---|---|
| Comp. Ex. | | |
| No. 1 | 95 | 100 |
| No. 2 | 100 | 111 |
| No. 3 | 111 | 117 |
| Ex. | | |
| No. 4 | 116 | 105 |
| No. 5 | 113 | 89 |
| No. 6 | 116 | 90 |
| No. 7 | 114 | 93 |
| No. 8 | 114 | 97 |
| No. 9 | 114 | 95 |
| No. 10 | 112 | 101 |
| No. 11 | 107 | 100 |
| No. 12 | 105 | 102 |
| No. 13 | 112 | 96 |
| No. 14 | 113 | 94 |
| No. 15 | 114 | 122 |

As seen from Table 4, the rubber compositions according to examples of the present invention were more excellent in wet grip performance than the rubber compositions according to the comparative examples. Further, the greater the value of T.I.R. grew, the more excellent the fuel saving performance became. In particular, the rubber compositions with T.I.R. values of 1.0 or more were excellent in the fuel saving performance relative to the comparative rubber compositions. The rubber compositions with T.I.R. values of 1.5 or more (Nos. 5–9, 13 and 14), in particular, were highly excellent in the fuel saving performance.

In the rubber compositions in accordance with the present invention, blending of hexamethylenediamine resulted in rubber compositions (Nos. 5 to 14) with T.I.R. value higher than that of the rubber composition resulting from blending of N-hexylamine or a monoamine (the rubber composition No. 4), and hence led to more improved wet grip and fuel saving performances. The use of an epoxidized diene rubber solely (the rubber compositions Nos. 4 to 8) as the rubber component was found to give a higher T.I.R value and more improved wet grip and fuel saving performances than the use of a blend of an epoxidized diene rubber and a rubber having no epoxy group (the rubber compositions Nos. 9–14).

Rubber compositions Nos. 16–25

Rubber compositions Nos. 16 to 25 were prepared by mixing the compounding ingredients B listed in Table 5 with different types and contents of rubber components and diamine compounds (Nos. 1–8 in Table 1) shown in Table 6. The content of each diamine compound was such that the formula (1) unit content relative to 100 parts by weight of the rubber component was 8.6 mmol. The epoxidized diene rubber and carbon black (HAF) were the same as used in the rubber compositions No. 1–15.

TABLE 5

| Compounding ingredients B | Amount (wt. parts) |
|---|---|
| Rubber component | 100 |
| Chinese white | 5 |
| Stearic acid | 1 |
| Sulfur | 1.75 |
| Vulcanization accelerator (Acc. NS) | 1 |
| Diamine compound | varied |
| Carbon black (HAF) | 45 |

As in the same manner as with the rubber composition No. 1, tanδ at −10° C. and 70° C. of each of the rubber compositions 16–25 were measured and then the characteristics W.I.R., R.I.R. and T.I.R. were calculated. For the calculation of W.I.R., R.I.R. and T.I.R., the rubber composition No. 16 was employed as a control rubber composition.

TABLE 6

| | Comparative Ex. | | Example | | | | | | Comparative Example | | |
|---|---|---|---|---|---|---|---|---|---|---|---|
| Rubber Composition No. | 16 | 17 | 18 | 19 | 20 | 21 | 22 | 23 | 24 | 25 |
| Rubber component | | | | | | | | | | |
| Natural Rubber | 100 | — | — | — | — | — | — | — | — | — |
| Epoxidized natural rubber 25 | — | 100 | 100 | 100 | 100 | 100 | 100 | 100 | 100 | 100 |
| Diamine compound | | | | | | | | | | |
| ① | — | — | 1.48 | — | — | — | — | — | — | — |

TABLE 6-continued

|  | Comparative Ex. | | Example | | | | | Comparative Example | | |
|---|---|---|---|---|---|---|---|---|---|---|
| Rubber Composition No. | 16 | 17 | 18 | 19 | 20 | 21 | 22 | 23 | 24 | 25 |
| ② | — | — | — | 1.12 | — | — | — | — | — | — |
| ③ | — | — | — | — | 1.24 | — | — | — | — | — |
| ④ | — | — | — | — | — | 1.84 | — | — | — | — |
| ⑤ | — | — | — | — | — | — | 1 | — | — | — |
| ⑥ | — | — | — | — | — | — | — | 1.41 | — | — |
| ⑦ | — | — | — | — | — | — | — | — | 2.19 | — |
| ⑧ | — | — | — | — | — | — | — | — | — | 2.31 |
| Formula (1) unit content (mmol) | — | — | 8.6 | 8.6 | 8.6 | 8.6 | 8.6 | 8.6 | 8.6 | 8.6 |
| Characteristics | | | | | | | | | | |
| tan δ (−10° C.) | 0.147 | 0.470 | 0.518 | 0.597 | 0.586 | 0.447 | 0.468 | 0.421 | 0.439 | 0.487 |
| tan δ (70° C.) | 0.070 | 0.139 | 0.092 | 0.108 | 0.059 | 0.128 | 0.127 | 0.145 | 0.139 | 0.142 |
| W.I.R | 0 | 2.20 | 2.52 | 3.06 | 2.99 | 2.24 | 2.18 | 1.86 | 1.99 | 2.31 |
| R.I.R | 0 | −0.99 | −0.31 | −0.54 | 0.31 | −0.83 | −0.81 | −1.07 | −0.99 | −1.03 |
| T.I.R | 0 | 0.23 | 1.90 | 1.98 | 3.30 | 0.59 | 0.56 | −0.28 | 0.01 | 0.26 |

As can be seen from Table 6, the rubber composition No. 16 was a comparative example containing no epoxidized diene rubber, and the rubber composition No. 17 was an comparative example containing an epoxidized diene rubber but free of any diamine compound. Further, the rubber compositions Nos. 23–25 were comparative examples which had T.I.R. values of less than 0.3.

Wet grip and fuel saving performances and rolling workability were evaluated on the thus prepared rubber compositions Nos. 16 to 25 by the aforementioned evaluation method. The results were as shown in Table 7.

TABLE 7

| Rubber composition No. | Wet grip | Fuel saving | Rolling workability |
|---|---|---|---|
| Comp. Ex. | | | |
| No. 16 | 92 | 89 | ○ |
| No. 17 | 110 | 109 | X |
| Ex. | | | |
| No. 18 | 113 | 95 | Δ |
| No. 19 | 116 | 101 | Δ |
| No. 20 | 115 | 87 | Δ |
| No. 21 | 112 | 105 | Δ |
| No. 22 | 110 | 104 | Δ |
| Comp. Ex. | | | |
| No. 23 | 109 | 113 | Δ |
| No. 24 | 109 | 109 | Δ |
| No. 25 | 112 | 110 | Δ |

As seen from Table 7, rubber compositions containing the epoxidized rubber and amine compound and exhibiting larger T.I.R. values tended to show excellent wet grip and fuel saving performances though they showed slight variations. Rubber compositions exhibiting T.I.R. values of 1.5 or more, in particular, showed excellent fuel saving performance (refer to compositions Nos. 18–20). Further, it was found that the use of the epoxidized rubber resulted in a rubber composition of degraded rolling workability (composition No. 17), but the combination of the amine compound with the epoxidized rubber recovered the rolling workability to such an extent as to cause no practical problem (compositions No. 18–25).

Compounding of rubber compositions containing epoxidized natural rubber, diamine compound and carboxylic acid Rubber compositions Nos. 26–33

Rubber compositions Nos. 26 to 33 were prepared by mixing the compounding ingredients C listed in Table 8 with different types and contents of rubber components, diamine compounds and carboxylic acids shown in Table 9.

TABLE 8

| Compounding ingredients C | Amount (wt. parts) |
|---|---|
| Rubber component | 100 |
| Zinc oxide | 5 |
| Stearic acid | 1 |
| Sulfur | 1.75 |
| Vulcanization accelerator (Acc. NS) | 1 |
| Aromatic oil | 16 |
| SUNNOX S | 1.5 |
| NOCRACK 6C | 1.5 |
| Diamine compound | varied |
| Carboxylic acid | varied |
| Carbon black (N351) | 55 |

Carbon black (N351) in Table 8 has a nitrogen adsorption specific surface area of 81 m²/g and DBP oil absorption of 100 ml/g.

As in the same manner as with the rubber composition No. 1, tanδ at −10° C. and 70° C. of each of the rubber compositions 26–33 were measured and then the characteristics W.I.R., R.I.R. and T.I.R. were calculated. For the calculation of W.I.R., R.I.R. and T.I.R., the rubber composition No. 26 was employed as a control rubber composition. Table 9 shows compounding ingredients of rubber compositions Nos. 26–33, contents of amino group and carboxyl group, and values of tanδ, W.I.R., R.I.R. and T.I.R.

TABLE 9

|  | Comparative Ex. | Example | | | | | | |
|---|---|---|---|---|---|---|---|---|
| Rubber Composition No. | 26 | 27 | 28 | 29 | 30 | 31 | 32 | 33 |
| Rubber component | | | | | | | | |
| Natural Rubber | 100 | — | — | — | — | — | — | — |

TABLE 9-continued

|  | Comparative Ex. | | Example | | | | | |
| --- | --- | --- | --- | --- | --- | --- | --- | --- |
| Rubber Composition No. | 26 | 27 | 28 | 29 | 30 | 31 | 32 | 33 |
| Epoxidized natural rubber 25 | — | 100 | 100 | 100 | 100 | 100 | 100 | 100 |
| Diamine Compound | | | | | | | | |
| ⑨ | — | — | 1 | 1 | 1 | 1 | — | 1 |
| ① | — | — | — | — | — | — | 1.48 | — |
| Carboxylic acid | | | | | | | | |
| Suberic acid | — | — | — | 0.75 | 1.5 | 2.25 | 1.5 | — |
| Hexoic acid | — | — | — | — | — | — | — | 2.0 |
| Amino group content (mmol) ($M_A$) | — | — | 17.2 | 17.2 | 17.2 | 17.2 | 17.2 | 17.2 |
| Formula (1) unit content (mmol) | — | — | 8.6 | 8.6 | 8.6 | 8.6 | 8.6 | 8.6 |
| Carboxyl group content (mmol) ($M_C$) | — | — | — | 8.6 | 17.2 | 25.8 | 17.2 | 17.2 |
| $M_C/M_A$ | — | — | — | 0.5 | 1 | 1.5 | 1 | 1 |
| Characteristics | | | | | | | | |
| tan δ (−10° C.) | 0.211 | 0.506 | 0.510 | 0.472 | 0.529 | 0.527 | 0.477 | 0.463 |
| tan δ (70° C.) | 0.106 | 0.179 | 0.085 | 0.099 | 0.089 | 0.106 | 0.137 | 0.105 |
| W.I.R | 0 | 1.40 | 1.42 | 1.24 | 1.51 | 1.50 | 1.26 | 1.19 |
| R.I.R | 0 | −0.69 | 0.20 | 0.07 | 0.16 | 0 | −0.29 | 0.01 |
| T.I.R | 0 | 0.12 | 1.81 | 1.37 | 1.83 | 1.50 | 0.68 | 1.21 |

As can be seen from Table 9, the rubber composition No. 26 was a comparative example containing no epoxidized diene rubber, and the rubber composition No. 27 was an comparative example containing an epoxidized diene rubber but free of any diamine compound. Further, the rubber composition No. 28 was an example not containing any carboxylic acid, and the rubber composition No. 33 was an example containing a monocarboxylic acid (hexoic acid) instead of a dicarboxylic acid (suberic acid). All of these are precluded from rubber compositions according to claim 2. Rubber compositions Nos. 29 to 32 were examples incorporated with both the diamine compound and dicarboxylic acid which were included in rubber compositions according to claim Wet grip and fuel saving performances and rolling workability were evaluated on the thus prepared rubber compositions Nos. 26 to 33 by the aforementioned evaluation method. The results were as shown in Table 10.

TABLE 10

| Rubber composition No. | Wet grip | Fuel saving | Rolling workability |
| --- | --- | --- | --- |
| Comp. Ex. | | | |
| No. 26 | 98 | 102 | ◯ |
| No. 27 | 112 | 114 | X |
| Ex. | | | |
| No. 28 | 112 | 97 | Δ |
| No. 29 | 110 | 101 | ◯ |
| No. 30 | 114 | 97 | ◯ |
| No. 31 | 113 | 103 | ◯ |
| No. 32 | 111 | 111 | ◯ |
| No. 33 | 109 | 104 | Δ |

As seen from Table 10, any of examples containing the diamine compound exhibited satisfactory wet grip performance. Although the rubber compositions Nos. 31–33 showed fuel saving performance inferior to that of the control rubber composition No. 26, such inferiority was within the allowable range. When taking the wet grip and fuel saving performances as a whole, the rubber compositions of examples were more excellent than the control rubber composition. The rubber compositions having T.I.R. values of 1.0 or more, especially 1.5 or more (Nos. 28 and 30) were more excellent in the fuel saving performance than the control rubber composition.

Further, the rubber compositions Nos. 28 and 33 containing the diamine compound but free of the dicarboxylic acid both exhibited slightly inferior rolling workability Effect of epoxidized SBR Rubber compositions Nos. 34–37

Rubber compositions Nos. 34 to 37 were prepared by mixing the compounding ingredients shown in Table 11. As the diamine compound was used hexamethylenediamine, and as the epoxidized rubber were used epoxidized natural rubber and epoxidized SBR-1 resulting from epoxidization of solution-polymerized SBR-1. The solution-polymerized SBR-1 was a product of Nippon Gosei Rubber Kabushiki Kaisha and contained 15% by weight of styrene and 57% by weight of a vinyl component. The epoxidized solution-polymerized SBR-1 was obtained in the following manner.

A separable flask of 2.5 liters provided with a cooler, agitator, thermometer and funnel was charged with 1.5 liters of toluene, to which added were 81 g of solution-polymerized SBR-1 and 1.62 g of 2,6-di-tert-butyl-4-methylphenol. The mixture was subjected to complete dissolution by warming to 40° C. In turn, this solution was added with 0.085 mol of formic acid, and when the solution became homogeneous, an aqueous solution of hydrogen peroxide was, added dropwise to the solution in an amount equivalent to 0.245 mol of hydrogen peroxide. The mixture thus obtained was subjected to reaction at 40° C. under stirring for 5 hours. The reaction solution was allowed to cool, and then washed with a diluted solution of sodium hydroxide, then with a washing water to remove unreacted formic acid and hydrogen peroxide. Finally, the resulting polymer was precipitated in excessive methanol and dried to give the epoxidized solution-polymerized SBR-1.

As in the same manner as with the rubber composition No. 1, tanδ at −10° C. and 70° C. of each of the rubber compositions 34–37 were measured and then the characteristics W.I.R., R.I.R. and T.I.R. were calculated. For the calculation of W.I.R., R.I.R. and T.I.R., the rubber composition No. 34 was employed as a control rubber composition. Table 11 shows compounding ingredients of rubber compositions Nos. 34–37, contents of amino group and formula (1) unit, and values of tanδ , W.I.R., R.I.R. and T.I.R.

Wet grip and fuel saving performances were evaluated on the thus prepared rubber compositions Nos. 34 to 37 by the aforementioned evaluation method. The results were also shown in Table 11.

TABLE 11

|  | Comparative Ex. | | Example | |
| --- | --- | --- | --- | --- |
| Rubber Composition No. | 34 | 35 | 36 | 37 |
| Rubber component | | | | |
| Natural rubber | 60 | — | — | — |
| Epoxidized natural rubber 25 | — | 60 | 60 | 60 |
| Solution-polymerized SBR-1 | 40 | 40 | 40 | — |
| Epoxidized solution-Polymerized SBR-1 | — | — | — | 40 |
| Hexamethylenediamine | — | — | 1 | 1 |
| Amino group content (mmol) | — | — | 17.2 | 17.2 |
| Formula (1) unit content (mmol) | — | — | 8.6 | 8.6 |
| Carbon black | 45 | 45 | 45 | 45 |
| Chinese white | 5 | 5 | 5 | 5 |
| Stearic acid | 1 | 1 | 1 | 1 |
| Sulfur | 1.75 | 1.75 | 1.75 | 1.75 |
| Vulcanization accelerator (Acc NS) | 1 | 1 | 1 | 1 |
| Characteristics | | | | |
| tan δ (−10° C.) | 0.212 | 0.382 | 0.441 | 0.554 |
| tan δ (70° C.) | 0.076 | 0.120 | 0.077 | 0.067 |
| W.I.R | 0 | 0.80 | 1.08 | 1.61 |
| R.I.R | 0 | −0.58 | −0.01 | 0.13 |
| T.I.R | 0 | −0.36 | 1.05 | 1.88 |
| Evaluation | | | | |
| Wet grip | 97 | 108 | 110 | 117 |
| Fuel saving | 92 | 106 | 92 | 90 |

As seen from Table 11, the rubber composition No. 35 containing the epoxidized natural rubber was inferior in fuel saving performance though superior in wet grip performance to the rubber composition No. 34 which was free of the epoxidized natural rubber. The use of combination of the epoxidized natural rubber and hexamethylenediamine permitted rubber compositions (Nos. 36 and 37) to exhibit improvements in both the wet grip and fuel saving performances. It can be reaffirmed from the comparison between the rubber compositions Nos. 36 and 37 that by using the rubber component entirely comprised of the epoxidized rubber, the wet grip performance is significantly improved (refer to the results shown in Table 4). Further, it can be inferred that by replacing a part of the epoxidized rubber with the epoxidized solution-polymerized SBR-1, the wet grip performance is improved (compare the rubber compositions Nos. 5 and 6 to No. 37).

Rubber compositions Nos. 38–40

Rubber compositions Nos. 38 to 40 were prepared by mixing the compounding ingredients shown in Table 12. As the diamine compound was used hexamethylenediamine, and as the epoxidized rubber was used epoxidized SBR 1502 resulting from epoxidization of SBR 1502 (emulsion-polymerized SBR). The epoxidized emulsion-polymerized SBR 1502 was obtained in the following manner.

A separable flask of 2.5 liters provided with a cooler, agitator, thermometer and funnel was charged with 1.5 liters of toluene, to which added were 81 g of SBR 1502 and 1.62 g of 2,6-di-tert-butyl-4-methylphenol. The mixture was subjected to complete dissolution by warming to 40° C.- In turn, this solution was added with 0.17 mol of formic acid, and when the solution became homogeneous, an aqueous solution of hydrogen peroxide was added dropwise to the solution in an amount equivalent to 0.49 mol of hydrogen peroxide. The mixture thus obtained was subjected to reaction at 40° C. under stirring for 5 hours. The reaction solution was allowed to cool, and then washed with a diluted solution of sodium hydroxide, then with a washing water to remove unreacted formic acid and hydrogen peroxide. Finally, the resulting polymer was precipitated in excessive methanol and dried to give the epoxidized SBR 1502. This reaction caused the glass transition temperature by DSC measurement to vary from −55° C. to 35° C., and a peak which was assumed to be attributed to epoxy group was observed near 890 $cm^{-1}$ by FT-IR.

As in the same manner as with the rubber composition No. 1, tan δ at −10° C. and 70° C. of each of the rubber compositions 38–40 were measured and then the characteristics W.I.R., R.I.R. and T.I.R. were calculated. For the calculation of W.I.R., R.I.R. and T.I.R., the rubber composition No. 38 was employed as a control rubber composition. Table 12 shows compounding ingredients of rubber compositions Nos. 38–40, contents of amino group and carboxyl group, and values of tan δ, W.I.R., R.I.R. and T.I.R.

Wet grip and fuel saving performances were evaluated on the thus prepared rubber compositions Nos. 38 to 40 by the aforementioned evaluation method. The results were also shown in Table 12.

TABLE 12

|  | Comparative Ex. | | Example |
| --- | --- | --- | --- |
| Rubber Composition No. | 38 | 39 | 40 |
| Rubber component | | | |
| SBR1502 | 100 | 100 | — |
| Epoxidized SBR1502 | — | — | 100 |
| Hexamethylenediamine | — | 1 | 1 |
| Amino group content (mol) | — | 17.2 | 17.2 |
| Formula (1) unit content (mmol) | — | 8.6 | 8.6 |
| Carbon black | 45 | 45 | 45 |
| Chinese white | 5 | 5 | 5 |
| Stearic acid | 1 | 1 | 1 |
| Sulfur | 1.75 | 1.75 | 1.75 |
| Vulcanization accelerator (Acc NS) | 1 | 1 | 1 |
| Characteristics | | | |
| tan δ (−10° C.) | 0.217 | 0.192 | 0.797 |
| tan δ (70° C.) | 0.126 | 0.137 | 0.091 |
| W.I.R | 0 | −0.12 | 2.67 |
| R.I.R | 0 | −0.09 | −0.28 |
| T.I.R | 0 | −0.29 | 3.23 |
| Evaluation | | | |
| Wet grip | 96 | 95 | 126 |
| Fuel saving | 105 | 109 | 97 |

As seen from Table 12, the use of hexamethylenediamine solely without combination with the epoxidized natural rubber was found to contribute to no change in wet grip and fuel saving performances from the comparison between the rubber compositions Nos. 38 and 39. The combination of the epoxidized natural rubber with hexamethylenediamine caused both the wet grip and fuel saving performances to be improved (refer to the rubber composition No. 40). Further, where the rubber component was entirely comprised of the epoxidized rubber, the use of the epoxidized SBR rather than the epoxidized natural rubber significantly improved the wet grip performance (compare the rubber composition No. 37 to No. 40).

Rubber compositions Nos. 41–42

Rubber compositions Nos. 41 and 42 were prepared by mixing the compounding ingredients shown in Table 13. As the diamine compound was used hexamethylenediamine, and as the epoxidized rubber was used epoxidized solution-polymerized SBR-2 resulting from epoxidization of solution-polymerized SBR-2. The solution-polymerized SBR-2 was a product of SUMITOMO KAGAKU CO. and contained 25% by weight of styrene and 40% by weight of a vinyl component. This epoxidization caused the glass transition temperature to vary from −40° C. to 26° C. by DSC measurement.

As in the same manner as with the rubber composition No. 1, tanδ at −10° C. and 70° C. of each of the rubber compositions 41 and 42 were measured and then the characteristics W.I.R., R.I.R. and T.I.R. were calculated. For the calculation of W.I.R., R.I.R. and T.I.R., the rubber composition No. 41 was employed as a control rubber composition. Table 13 shows compounding ingredients of rubber compositions Nos. 41 and 42, content of amino group, and values of tanδ, W.I.R., R.I.R. and T.I.R.

Wet grip and fuel saving performances were evaluated on the thus prepared rubber compositions Nos. 41 to 42 by the aforementioned evaluation method. The results were also shown in Table 13.

TABLE 13

| Rubber Composition No. | Comp. Ex. 41 | Example 42 |
|---|---|---|
| Rubber component | | |
| Solution-polymerized SBR-2 | 100 | — |
| Epoxidized solution-polymerized SBR-2 | — | 100 |
| Hexamethylenediamine | | 0.6 |
| Amino group content (mmol) | — | 10.3 |
| Formula (1) unit content (mmol) | — | 5.2 |
| Carbon black | 45 | 45 |
| Chinese white | 5 | 5 |
| Stearic acid | 1 | 1 |
| Sulfur | 1 | 1 |
| Vulcanization accelerator (Acc NS) | 0.6 | 0.6 |
| Characteristics | | |
| tan δ (−10° C.) | 0.450 | 1.146 |
| tan δ (70° C.) | 0.140 | 0.104 |
| W.I.R | 0 | 1.55 |
| R.I.R | 0 | 0.26 |
| T.I.R | 0 | 2.06 |
| Evaluation | | |
| Wet grip | 111 | 130 |
| Fuel saving | 111 | 102 |

From the comparison of the rubber compositions Nos. 41 and 42 with the rubber compositions Nos. 39 and 40, it is found that the use of the rubber component comprised of the solution-polymerized SBR rather than the emulsion-polymerized SBR contributed to improved wet grip performance. Accordingly, when stress is laid on the wet grip performance with the fuel saving performance being kept at conventional degree, a rubber composition preferably comprises a combination of the rubber component entirely formed of the epoxidized solution-polymerized SBR, and the amine compound.

As seen from Tables 11 to 13, the rubber compositions Nos. 37, 40 and 42 containing the epoxidized SBR as the epoxidized rubber exhibited higher T.I.R. values, and the combination of the amine compound with the epoxidized SBR contributed to superior wet grip and fuel saving performance.

As has been described, the rubber composition in accordance with the present invention contains an amine compound and satisfies specific requirements of tanδ in the high temperature region (70° C.) and tanδ in the low temperature region (−10° C.). The rubber composition exhibits significantly improved wet grip performance with the fuel saving performance little affected. Further, by varying the type and content of the amine compound, not only the wet grip performance but also the fuel saving performance can be improved. Therefore, the use of the rubber composition for tire of the present invention makes it possible to provide tires assuring safety and satisfactory fuel saving performance.

A rubber composition containing an amine compound and a carboxylic acid having two or more carboxyl groups according to another aspect of the present invention exhibits improved rolling workability and easily satisfies the requirements of tanδ. The use of such rubber composition will readily provide tires assuring safety and satisfactory fuel saving performance.

What is claimed is:

1. A rubber composition for a tire comprising a diene rubber having 2 to 30 epoxy groups, relative to 100 monomer units constituting the rubber either a monoamine compound or a diamine compound having a structural unit represented by the formula (1):

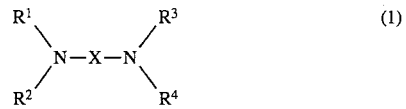

(where $R^1$, $R^2$, $R^3$ and $R^4$ are each a hydrogen atom or an alkyl group having one to three carbon atoms, and X is a component selected from the group consisting of a straight or branched chain aliphatic alkyl group an alicyclical hydrocarbon, an aromatic hydrocarbon, a polycyclic compound and a carboxyl group, and carbon black, wherein the rubber composition has a dissipation factor at −10° C. (tanδ (−10° C.)) and a dissipation factor at 70° C. (tanδ (70° C.)) which satisfy the following expressions:

0.03 ≦ tanδ (70° C.) ≦ 0.35

W.I.R. = {tanδ (−10° C.) − tanδc(−10° C.)}/tanδc(−10° C.)

R.I.R. = {tanδc(70° C.) − tanδ(70° C.)}/tanδc(70° C.)

T.I.R. = W.I.R. + 2×(R.I.R.) ≧ 0.3

(where tanδc(−10° C.) and tanδc(70° C.) are tanδ at −10° C. and 70° C. of a control rubber composition of the same formulation as the rubber composition for tire except that the control rubber composition includes a diene rubber having no epoxy group and is free of any amine compound).

2. The rubber composition for a tire as set forth in claim 1, wherein the content of the amine compound is such that the amount of amino group contained therein is 0.1 to 100 mmol relative to 100 parts by weight of the rubber component.

3. The rubber composition for a tire as set forth in claim 1, wherein said carbon black has a nitrogen adsorption specific surface of 50 to 250 m²/g and a DBP oil absorption of 60 to 150 ml/g, and the proportion of said carbon black is 20 to 150 parts by weight relative to 100 parts by weight of the rubber component.

4. The rubber composition for a tire as set forth in claim 1, wherein the T.I.R. is 1.0 or greater.

5. The rubber composition for a tire as set forth in claim 1, wherein the T.I.R. is 1.5 or greater.

6. The rubber composition for a tire as set forth in claim 1, further comprising a carboxylic acid having two or more carboxyl groups in the molecule thereof, and wherein said control rubber composition is free of the carboxylic acid.

7. The rubber composition for a tire as set forth in claim 6, wherein the content of said carboxylic acid is such that the carboxyl group contained therein is 0.2 to 200 mmol relative to 100 parts by weight of the rubber component.

8. The rubber composition for a tire as set forth in claim 6, wherein the ratio of the number of moles of the amino group to that of the carboxyl group satisfies the relationship $0.2 \leq M_C/M_A \leq 1.8$.

9. The rubber composition for a tire as set forth in claim 6, wherein the T.I.R. is 1.0 or greater.

10. The rubber composition for a tire as set forth in claim 7, wherein the T.I.R. is 1.5 or greater.

11. The rubber composition for a tire as set forth in claim 1, wherein said diene rubber is an epoxidized solution-polymerized SBR and said monoamine compound or diamine compound is hexamethylenediamine.

12. The rubber composition for a tire as set forth in claim 11, wherein the content of said hexamethylenediamine is such that the amino group contained therein is in an amount of 0.1 to 100 mmol relative to 100 parts by weight of the rubber component.

13. The rubber composition for a tire as set forth in claim 11, wherein the T.I.R is 1.5 or greater.

14. A tire tread comprising the rubber composition as recited in claim 1.

15. A tire containing a tire tread comprising the rubber composition as recited in claim 1.

16. A tire tread comprising the rubber composition as recited in claim 6.

17. A tire containing a tire tread comprising the composition as recited in claim 6.

* * * * *